US009227360B2

(12) United States Patent
Lulevich et al.

(10) Patent No.: US 9,227,360 B2
(45) Date of Patent: Jan. 5, 2016

(54) PREPARATION OF ALIGNED NANOTUBE MEMBRANES FOR WATER AND GAS SEPARATION APPLICATIONS

(71) Applicant: Porifera, Inc., Hayward, CA (US)

(72) Inventors: Valentin Lulevich, Berkeley, CA (US); Olgica Bakajin, San Leandro, CA (US); Jennifer E. Klare, Berkeley, CA (US); Aleksandr Noy, San Carlos, CA (US)

(73) Assignee: Porifera, Inc., Hayward, CA (US)

( * ) Notice: Subject to any disclaimer, the term of this patent is extended or adjusted under 35 U.S.C. 154(b) by 322 days.

(21) Appl. No.: 13/654,057

(22) Filed: Oct. 17, 2012

(65) Prior Publication Data
US 2013/0095241 A1 Apr. 18, 2013

Related U.S. Application Data

(60) Provisional application No. 61/627,718, filed on Oct. 17, 2011.

(51) Int. Cl.
| *B29C 57/10* | (2006.01) |
| *B01D 67/00* | (2006.01) |
| *B01D 69/14* | (2006.01) |
| *B01D 71/02* | (2006.01) |
| *B82Y 40/00* | (2011.01) |
| *B01D 71/46* | (2006.01) |

(52) U.S. Cl.
CPC ............ *B29C 57/10* (2013.01); *B01D 67/0079* (2013.01); *B01D 69/148* (2013.01); *B01D 71/021* (2013.01); *B01D 71/46* (2013.01); *B82Y 40/00* (2013.01)

(58) Field of Classification Search
None
See application file for complete search history.

(56) References Cited

U.S. PATENT DOCUMENTS

| 4,326,509 | A | 4/1982 | Usukura |
| 4,428,720 | A | 1/1984 | Van Erden et al. |
| 4,454,176 | A | 6/1984 | Buckfelder et al. |
| 4,618,533 | A | 10/1986 | Steuck |
| 5,593,738 | A | 1/1997 | Ihm et al. |
| 6,261,879 | B1 | 7/2001 | Houston et al. |
| 6,406,626 | B1 | 6/2002 | Murakami et al. |
| 6,413,070 | B1 | 7/2002 | Meyering et al. |
| 6,513,666 | B2 | 2/2003 | Meyering et al. |

(Continued)

FOREIGN PATENT DOCUMENTS

| CN | 101228214 A | 7/2008 |
| JP | S55149682 A | 11/1980 |

(Continued)

OTHER PUBLICATIONS

Li et al., "Electronic properties of multiwalled carbon nanotubes in an embedded vertical array", 2002, pp. 910-912, Applied Physics Letters v81n5.

(Continued)

*Primary Examiner* — Edmund Lee
(74) *Attorney, Agent, or Firm* — Dorsey & Whitney LLP

(57) ABSTRACT

Fabrication methods for selective membranes that include aligned nanotubes can advantageously include a mechanical polishing step. The nanotubes have their ends closed off during the step of infiltrating a polymer precursor around the nanotubes. This prevents polymer precursor from flowing into the nanotubes. The polishing step is performed after the polymer matrix is formed, and can open up the ends of the nanotubes.

12 Claims, 5 Drawing Sheets

(56) References Cited

U.S. PATENT DOCUMENTS

| | | |
|---|---|---|
| 6,755,970 B1 | 6/2004 | Knappe et al. |
| 6,849,184 B1 | 2/2005 | Lampi et al. |
| 6,884,375 B2 | 4/2005 | Wang et al. |
| 6,992,051 B2 | 1/2006 | Anderson |
| 7,205,069 B2 | 4/2007 | Smalley et al. |
| 7,445,712 B2 | 11/2008 | Herron |
| 7,611,628 B1* | 11/2009 | Hinds, III ............... 210/500.27 |
| 7,627,938 B2 | 12/2009 | Kim et al. |
| 7,901,578 B2 | 3/2011 | Pruet |
| 8,029,857 B2 | 10/2011 | Hoek et al. |
| 8,038,887 B2 | 10/2011 | Bakajin et al. |
| 8,177,978 B2 | 5/2012 | Kurth et al. |
| 8,356,717 B2 | 1/2013 | Waller, Jr. et al. |
| 8,518,276 B2 | 8/2013 | Striemer et al. |
| 8,567,612 B2 | 10/2013 | Kurth et al. |
| 2002/0063093 A1 | 5/2002 | Rice et al. |
| 2003/0038074 A1 | 2/2003 | Patil |
| 2004/0004037 A1 | 1/2004 | Herron |
| 2004/0071951 A1* | 4/2004 | Jin ............................. 428/323 |
| 2005/0142385 A1* | 6/2005 | Jin ............................ 428/694 T |
| 2006/0144789 A1 | 7/2006 | Cath et al. |
| 2006/0233694 A1* | 10/2006 | Sandhu et al. ............ 423/447.3 |
| 2008/0149561 A1 | 6/2008 | Chu et al. |
| 2008/0210370 A1 | 9/2008 | Smalley et al. |
| 2008/0223795 A1* | 9/2008 | Bakajin et al. ............... 210/767 |
| 2008/0236804 A1 | 10/2008 | Cola et al. |
| 2008/0290020 A1 | 11/2008 | Marand et al. |
| 2009/0078640 A1 | 3/2009 | Chu et al. |
| 2009/0214847 A1 | 8/2009 | Maruyama et al. |
| 2009/0250392 A1 | 10/2009 | Thorsen et al. |
| 2009/0272692 A1 | 11/2009 | Kurth et al. |
| 2009/0283475 A1 | 11/2009 | Hylton et al. |
| 2009/0308727 A1 | 12/2009 | Kirts |
| 2009/0321355 A1 | 12/2009 | Ratto et al. |
| 2010/0025330 A1 | 2/2010 | Ratto et al. |
| 2010/0051538 A1 | 3/2010 | Freeman et al. |
| 2010/0059433 A1 | 3/2010 | Freeman et al. |
| 2010/0062156 A1 | 3/2010 | Kurth et al. |
| 2010/0140162 A1 | 6/2010 | Jangbarwala |
| 2010/0155333 A1 | 6/2010 | Husain et al. |
| 2010/0206811 A1 | 8/2010 | Ng et al. |
| 2010/0212319 A1 | 8/2010 | Donovan |
| 2010/0224550 A1 | 9/2010 | Herron |
| 2010/0224561 A1 | 9/2010 | Marcin |
| 2010/0320140 A1 | 12/2010 | Nowak et al. |
| 2011/0036774 A1 | 2/2011 | McGinnis |
| 2011/0057322 A1* | 3/2011 | Matsunaga et al. ........... 257/774 |
| 2011/0073540 A1 | 3/2011 | McGinnis et al. |
| 2011/0132834 A1 | 6/2011 | Tomioka et al. |
| 2011/0186506 A1 | 8/2011 | Ratto et al. |
| 2011/0220574 A1 | 9/2011 | Bakajin et al. |
| 2011/0284456 A1 | 11/2011 | Brozell et al. |
| 2012/0043274 A1 | 2/2012 | Chi et al. |
| 2012/0080378 A1 | 4/2012 | Revanur et al. |
| 2012/0080381 A1 | 4/2012 | Wang et al. |
| 2012/0241371 A1 | 9/2012 | Revanur et al. |
| 2012/0251521 A1 | 10/2012 | Rostro et al. |
| 2012/0273421 A1 | 11/2012 | Perry et al. |
| 2013/0203873 A1 | 8/2013 | Linder et al. |
| 2014/0015159 A1* | 1/2014 | Lazar et al. ...................... 264/81 |
| 2014/0302579 A1 | 10/2014 | Boulanger et al. |

FOREIGN PATENT DOCUMENTS

| | | |
|---|---|---|
| JP | S5959213 A | 4/1984 |
| JP | 62-140620 | 6/1987 |
| JP | 2055-138028 | 6/2005 |
| JP | 2010094641 A | 4/2010 |
| WO | 9962623 | 12/1999 |
| WO | 0213955 A1 | 2/2002 |
| WO | 2008137082 A1 | 11/2008 |
| WO | 2009-035415 | 3/2009 |
| WO | 2009039467 A1 | 3/2009 |
| WO | 2009129354 A2 | 10/2009 |
| WO | 2009129354 A3 | 10/2009 |
| WO | 2010006196 A2 | 1/2010 |
| WO | 2010144057 A1 | 12/2010 |
| WO | 2011028541 A2 | 3/2011 |
| WO | 2012047282 A1 | 4/2012 |
| WO | 2012/135065 | 10/2012 |
| WO | 2013/059314 | 4/2013 |
| WO | 2014/071238 A1 | 5/2014 |

OTHER PUBLICATIONS

International Search Report & Written Opinion for PCT Application No. PCT/US2012/060607 dated Oct. 31, 2012.

Search Report and Written Opinion dated May 1, 2012 for Appl No. PCT/US2011/001701.

Akthakul, et al., "Antifouling polymer membranes with subnanometer size selectivity", Macromolecules 37, Sep. 3, 2004, 7663-7668.

Cath, et al., "Forward osmosis: principles, applications and recent developments", Journal of Membrane Science 281, May 31, 2006, 70-87.

Mandal, et al., "Drug delivery system based on chronobiology—a review", Journal of Controlled Release 147, Aug. 4, 2010, 314-325.

McCutcheon, et al., "Influence of membrane support layer hydrophobicity on water flux in osmotically driven membrane processes", Journal of Membrane Science, Mar. 2008, 458-466.

Santus, et al., "Osmotic drug delivery: a review of the patent literature", Journal of Controlled Release 35, Jul. 1995, 1-21.

Sotthivirat, et al., "Controlled porosity-osmotic pump pellets of a poorly water-soluble drug using sulfobutylether-b-cyclodestrin, (SBE)_7M-b-CD, as a solubilizing and osmotic agent", Journal of Pharmaceutical Sciences vol. 96, No. 9, Sep. 2007, 2364-2374.

Yip, et al., "High Performance Thin-Film Composite Forward Osmosis Membrane", Environmental Science and Technology, Apr. 21, 2010, 3812-3818.

Zhao, et al., "Modification of porous poly(vinylidene fluoride) membrane using amphiphilic polymers with different structures in phase inversion process", Journal of Membrane Science 310, Mar. 2008, 567-576.

McEuen, P. et al., "Single-Walled Nanotubes Electronics", IEEE Transactions on Nanotechnology, Vo.1, No. 1, Mar. 2002.

* cited by examiner

PREPARATION OF ALIGNED NANOTUBE MEMBRANES FOR WATER AND GAS SEPARATION APPLICATIONS

CROSS REFERENCE TO RELATED APPLICATIONS

This application claims the benefit of U.S. provisional patent application 61/627,718, filed on Oct. 17, 2011, entitled "Preparation of aligned carbon nanotube membranes for water and gas separation applications", and hereby incorporated by reference in its entirety.

GOVERNMENT SPONSORSHIP

This invention was made with Government support under contract number DE-AR0000025 awarded by the Department of Energy and under contract number W911NF-09-C-0079 awarded by the Department of Defense. The Government has certain rights in this invention.

FIELD OF THE INVENTION

This invention relates to selectively permeable membranes.

BACKGROUND

Carbon nanotubes have been employed in connection with selectively permeable membranes for some time. Despite this work, various problems remain to be solved. For example, conventional fabrication methods for such membranes tend to suffer from problems such as: limited choice of membrane materials, difficulty achieving large and uniform membranes, and/or disappointing membrane performance (e.g. poor results relative to small-scale proof of concept work). Accordingly, it would be an advance in the art to alleviate these issues.

SUMMARY

We have found, surprisingly, that fabrication methods for selective membranes that include aligned nanotubes can advantageously include a mechanical polishing step. Another important aspect of the present approach is that the nanotubes have their ends closed off during the step of infiltrating a polymer precursor around the nanotubes. This closed-off nature of the tube ends advantageously prevents polymer precursor from flowing into the nanotubes. The polishing step is performed after the polymer matrix is formed, and can open up the ends of the nanotubes. This work demonstrates the compatibility of mechanical polishing with nanotubes in a polymer matrix, which does not appear to have previously been appreciated in the art. A further, and unexpected, feature of the present results is a surprising dependence of membrane performance on membrane thickness. Membranes that are too thick suffer a catastrophic loss in permeability.

DETAILED DESCRIPTION

A) Principles

Figure 1A:
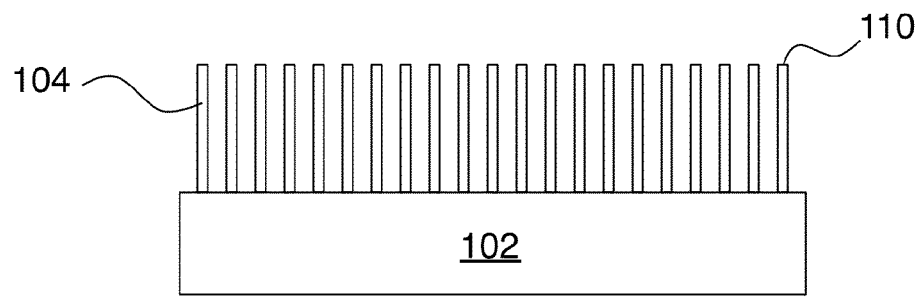
FIGS. 1a-d show an exemplary fabrication sequence according to principles of the invention.
Figure 1B:
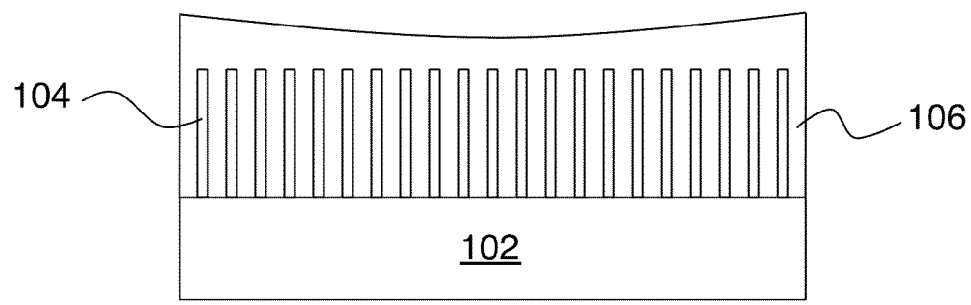
Figure 1C:
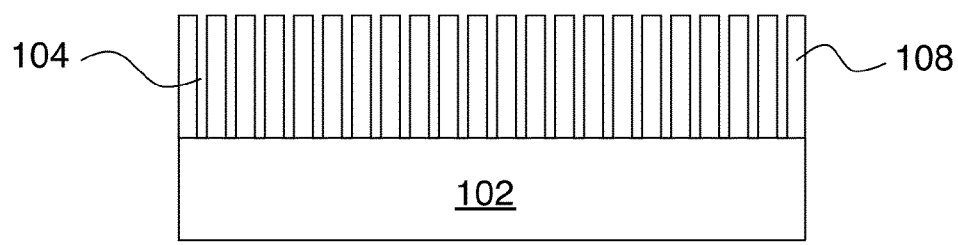
Figure 1D:
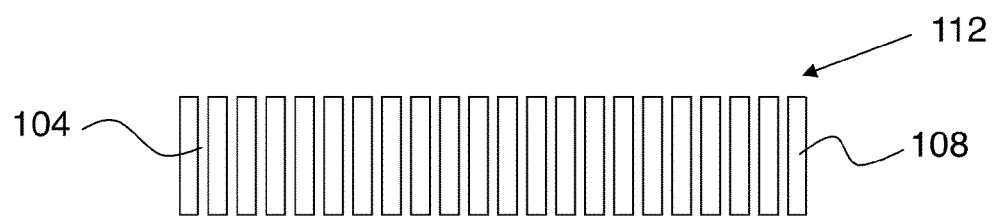

FIGS. 1a-d show an exemplary fabrication sequence relating to embodiments of the invention. FIG. 1a shows vertically aligned nanotubes (one of which is referenced as 104) on a substrate 102. Nanotubes 104 have closed top ends (one of which is referenced as 110). FIG. 1b shows the result of infiltrating a polymer precursor 106 around nanotubes 104. FIG. 1c shows the result of curing polymer precursor 106 to provide polymer matrix 108 around the nanotubes, followed by mechanical polishing of the top surface of the wafer. Here it is convenient to refer to the structure including substrate 102, polymer matrix 108, and nanotubes 104 as a wafer. As a result of this polishing, the top ends of nanotubes 104 become open, and the top surface of the structure is effectively planarized (as schematically shown). FIG. 1d shows the result of releasing the polymer matrix from substrate 102 to provide a selectively permeable membrane 112.

Preferably, releasing the polymer matrix from the substrate also opens up the bottom ends of the nanotubes, as shown on FIG. 1d. Preferable, the nanotubes include carbon nanotubes (CNTs). The nanotubes can be single-walled nanotubes, double-walled nanotubes, multi-walled nanotubes, or any mixture or combination thereof.

Mechanical grinding is a process of controlled removal of material using abrasive particles. Typically for a mechanical grinding process, abrasive particles are embedded into a polishing pad. A dynamic polishing head presses the pad and the wafer together and rotates, typically in a random orbital motion. This process removes material and tends to make the wafer surface planar over a large surface area.

Mechanical grinding possesses several advantageous features in this context. First, polishing can provide large scale removal of material, in sharp contract with microfabrication processes such as wet and dry etching. Second, polishing can provide uniform membrane thickness over a large membrane area, also in sharp contrast with chemical etching processes. Third, processing is simplified by removal of excess material, thickness control and opening of the nanotube pores in a single polishing step. Fourth, the resulting membranes provide flow only through the nanotubes, since there is no way for polymer matrix material between the nanotubes to be preferentially removed by polishing. Fifth, a larger membrane area is possible with polishing as compared to other nanotube membrane fabrication approaches, such as slicing with a microtome or etching in plasma/argon ions. Sixth, nanotube membranes can be made of virtually any material, because polishing is a generally applicable technique that does not depend critically on membrane materials.

To prepare CNT samples for grinding, a polymer or polymer solvent or monomers with catalyst (i.e., a polymer precursor) for in-situ polymerization can be infiltrated on top of the CNT array and the initial excess layer can be removed by casting or spinning. This procedure is gentle enough that it does not disturb or misalign the carbon nanotubes. After infiltration, the polymer precursor can be cross-linked to form a solid polymer matrix that can be polished down to expose the carbon nanotube ends. The mechanical grinding process can be controlled by any of several criteria: difference in tube/polymer physical properties (e.g., electrical conductivity, coefficient of friction), direct measurement of film thickness (e.g., with a micrometer, ultrasound, microscopy) or by testing flow though the nanotubes.

The CNT membranes prepared by these methods can be reinforced by attaching appropriate support layers. A support layer with pore size significantly larger than CNT pore size can be made by: polymer phase inversion (polyaramids such as Nomex®, Polyvinylpyrrolidone, etc.) or melting or gluing pre-fabricated meshes (e.g., non-woven polyester mesh, stainless steel mesh) onto a membrane surface. After attaching these supports the membrane can be released from substrate 102 by placing in an appropriate etchant (HF, HCl), or by mechanical removal from the substrate.

The vertically aligned nanotubes with closed top ends can be provided in two ways: 1) nanotubes having open top ends can be formed on the substrate (e.g., by forming carbon nanotubes using acetylene), followed by a separate step of closing the top ends of the nanotubes prior to infiltration by the polymer precursor; and 2) nanotubes having closed top ends can be formed on the substrate (e.g., by forming carbon nanotubes using ethylene). Open top ends of carbon nanotubes can be closed by deposition of a thin metal film, a polymer or amorphous carbon.

Preferably, the mechanical polishing provides a membrane thickness of less than about 100 µm. More preferably the membrane thickness is less than about 50 µm, and still more preferably, the membrane thickness is less than about 35 µm. The effect of membrane thickness is considered in greater detail in section B below.

Preferably, the polymer matrix includes a cross-linked polymer. More preferably, the polymer matrix includes a hydrophobic epoxy. Suitable hydrophobic epoxies include, but are not limited to: Bondit® B45 and Pelco® Eponate 502. However, any other kind of polymer matrix can be employed in practicing embodiments of the invention.

Practice of the invention does not depend critically on how the vertically aligned nanotubes are formed on the substrate. Suitable fabrication methods are known in the art, including but not limited to: thermal chemical vapor deposition (CVD) using a catalyst of iron or nanoparticles; and plasma assisted CVD.

B) Example 1

Membrane Thickness (Polished® BONDIT® 45 Epoxy)

Carbon nanotubes were grown in an Aixtron Black Magic CVD furnace using 1 nm of Fe and 0.1 nm of Mo as a catalyst deposited over 30 nm of alumina on a standard 2" silicon wafer. The catalyst was deposited in an e-beam evaporator using very slow (i.e., 0.01-0.02 nm/s) deposition rates. CNTs were synthesized at 500-650° C. catalyst annealing temperature, 90 mbar synthesis pressure, acetylene concentration 10 sccm, grow temperature 650-700° C. As-grown nanotubes were approximately 20-35 microns tall. A thin layer of gold was used to close the ends of the CNTs as described in section C below.

Bandit® B45 epoxy solution was prepared using a standard 1.7 oz cartridge and mixing nozzle. The CNT array was infiltrated in fresh epoxy solution for 20 min. The initial excess of the epoxy was gently removed via spinning 2 min in a spin coater at 500 rpm and the epoxy was cured at 70° C. overnight.

After curing, the excess layer of epoxy was polished using a 10" polishing plate spinning at 50-100 rpm. Microcushioned SiC sandpaper disks with grid 400, 600, 800 and 1200 were used to achieve a final membrane thickness of 10-50 µm.

Water was used as the slurry. The quality of the polishing was inspected in optical and electron microscope and characterized using electrical conductivity: for a well-polished layer with exposed CNTs, the resistance between substrate 102 and the top layer of polymer/CNT composite was 2-15 kΩ (an underpolished wafer surface is essentially insulating). Thus, the electrical conductivity changes from basically zero to a finite value (e.g., 2-15 kΩ) when the polishing reaches the top ends of the nanotubes.

After the CNT array was polished to the desired height, a reinforcing polymer mesh was gently melted on the top of the CNT forest/polymer mixture and the resulting membrane was released from the substrate in 10% HF (typically within 20-60 min).

After releasing in HF, the membrane was dried in vacuum (10-100 mbar) and washed in water (5-10 min). The catalyst residue from the substrate side was etched 1-5 min by $O_2$ plasma using 50-100 W power.

Figure 2A:
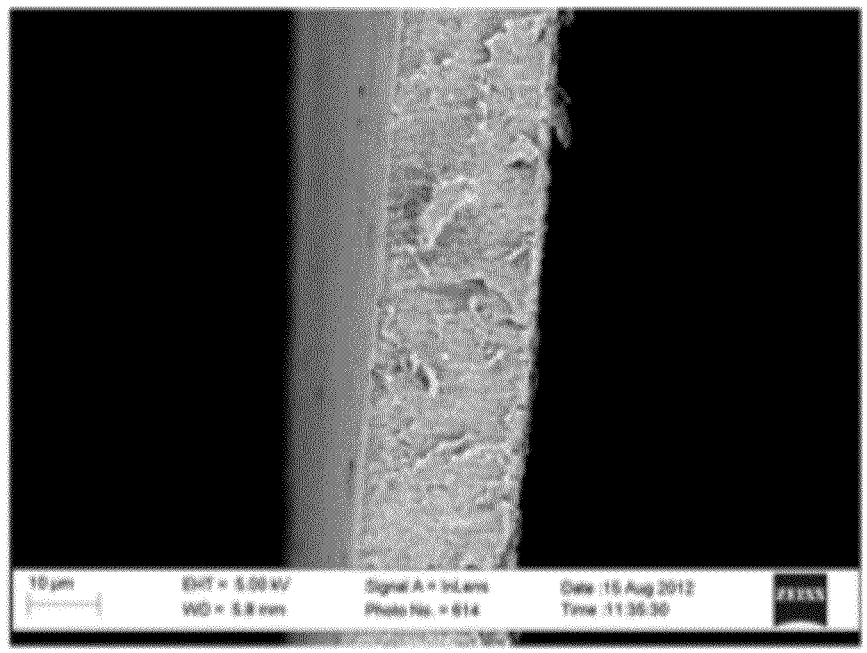
FIGS. 2a-c show electron microscope images of membranes fabricated according to principles of the invention.
Figure 2B:
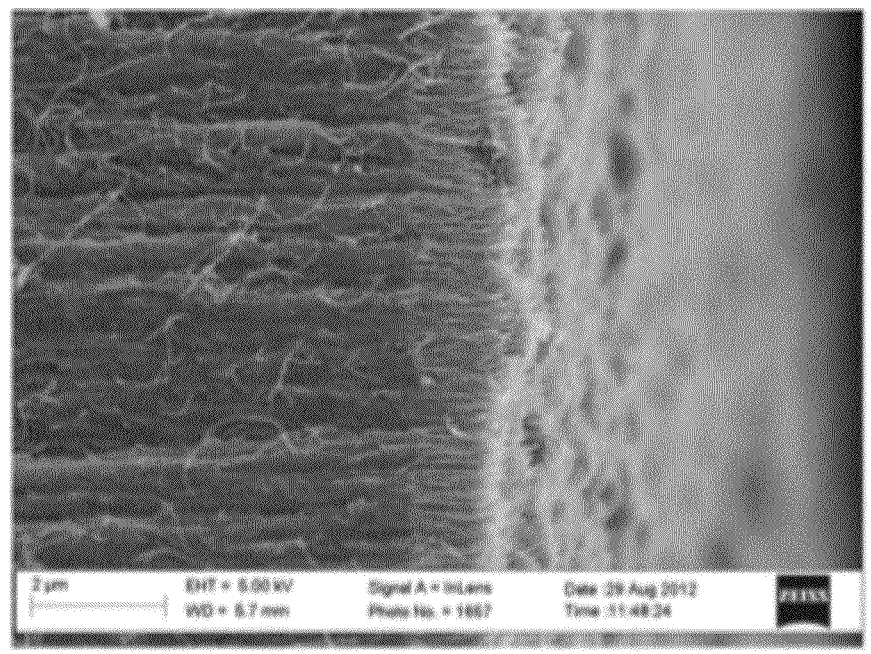
Figure 2C:
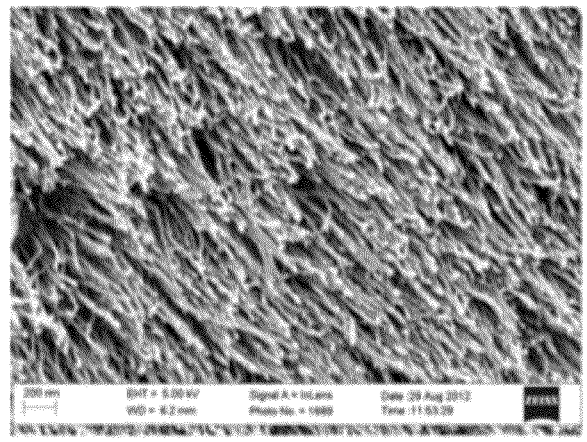

The quality of epoxy infiltration and CNT alignment can be observed on scanning electron microscope (SEM) images of the membrane as shown on FIGS. 2a-c. FIG. 2a shows an edge view of a released membrane. FIG. 2b is an enlarged cross section view of the membrane of FIG. 2a. FIG. 2c is an enlarged top view of the membrane of FIG. 2a. These SEM images show exposed undamaged CNT ends and good epoxy infiltration throughout the membrane.

As indicated above, membrane thickness is unexpectedly important for membrane performance. Table 1 shows some illustrative results.

TABLE 1

| Membrane name | Thickness (µm) | $N_2$ Permeability (GPU) |
| --- | --- | --- |
| 0705R6b1 | 41 | 2.75 |
| 0705R6a2 | 35 | 60 |
| 0705R7a1-1 | 32 | 300 |
| 0705R6a1-2 | 30 | 290 |
| 0627R1a1 | 25 | 650 |
| 0627R2c1 | 15 | 1100 |

CNT membrane flux as a function of membrane thickness. All membranes were made using same CNT wafer. Here GPU refers to gas permeation unit. A conversion factor for this unit is 1 GPU = 7.5e−16 ms$^{-1}$Pa$^{-1}$.

Here we see that the permeability of the membrane depends very significantly on membrane thickness. This thickness dependence is not predicted by Knudsen or hydrodynamic flow theories. In particular, theoretical models typically predict a linear dependence of permeability on inverse membrane thickness (1/L). The results of Table 1, as shown on FIG. 3b, differ significantly from this prediction, which is an indication of unexpected behavior.

Figure 3A:
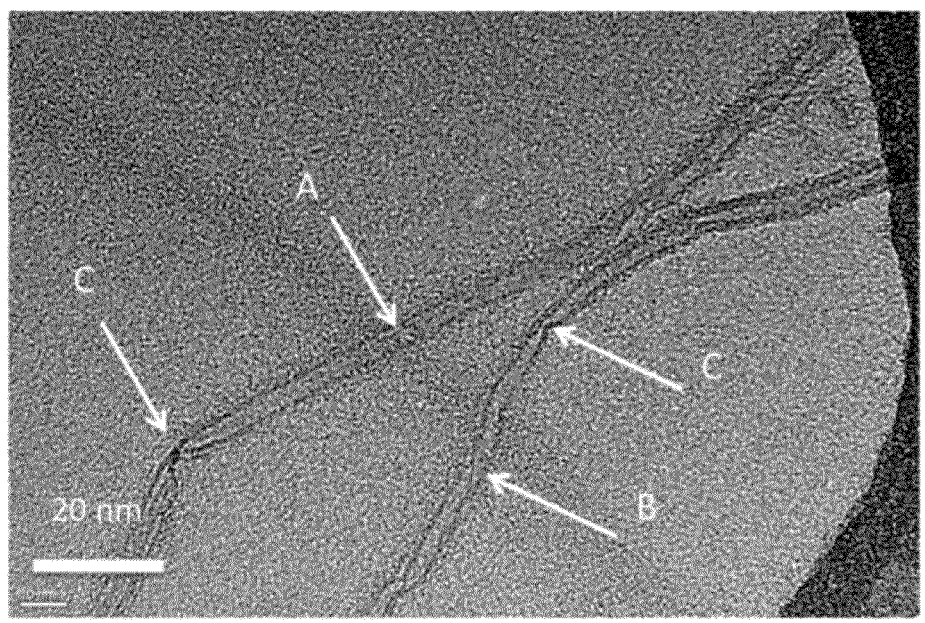
FIG. 3a shows a transmission electron microscope image of nanotube defects.
Figure 3B:
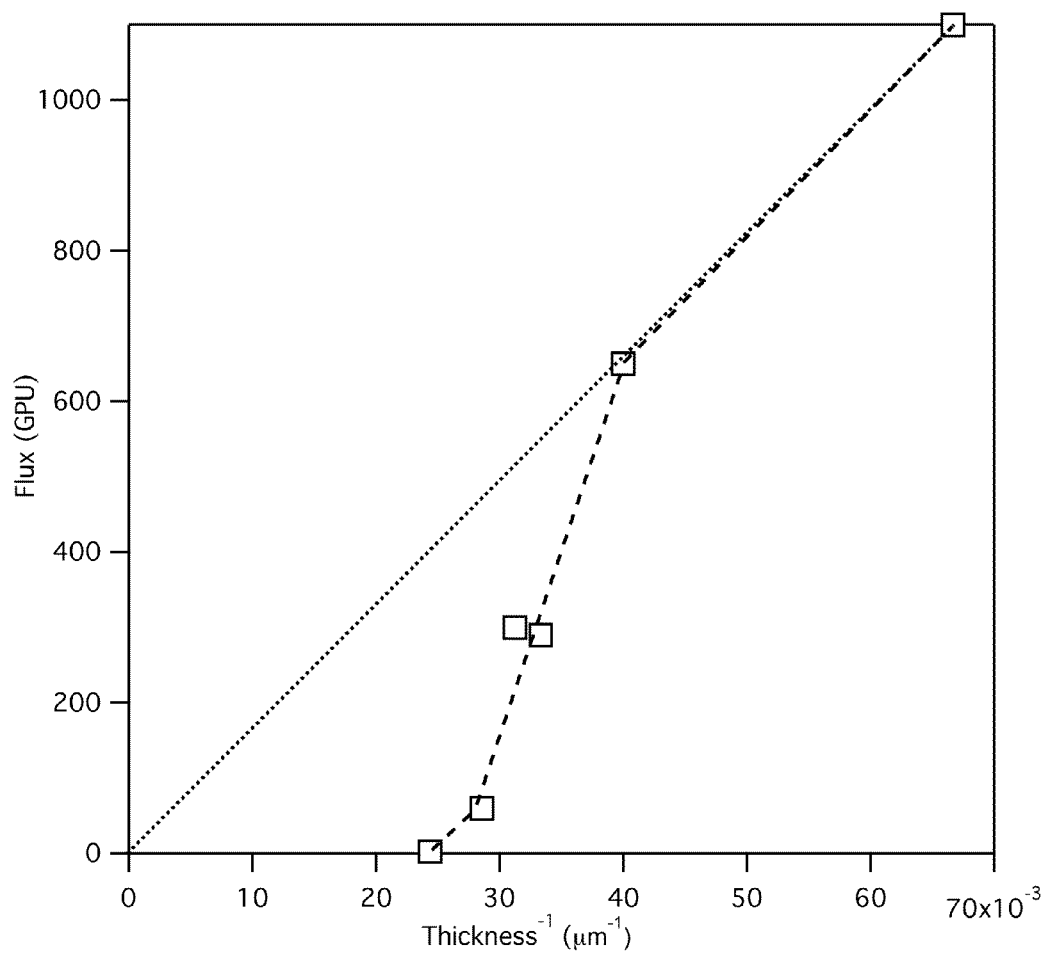
FIG. 3b is a plot of membrane flux vs. inverse thickness.

Without being bound by theory, we presently attribute this behavior to nanotube defects. Even carefully synthesized single and double wall carbon nanotubes have various channel defects such as amorphous carbon plug, in-grown inner wall or pinch points due to mechanical damage. The transmission electron microscope image of FIG. 3a shows examples of an amorphous carbon plug (a), an in-grown inner wall (b), and (c) pinch points due to mechanical damage. Therefore, depending on CNT quality, the membrane has a certain threshold thickness below which the membrane flux dramatically increases. For example, if the CNT defect rate corresponds to an average defect rate of one defect for every 50 µm of nanotube length (roughly), then the threshold thickness would also be roughly 50 µm (this threshold value for the membranes of Table 1 is 35 µm). In present experiments, suitable membranes thicknesses are typically between about 10 µm and about 50 µm.

C) Example 2

Effect of Closed Tubes

Figure 4A:
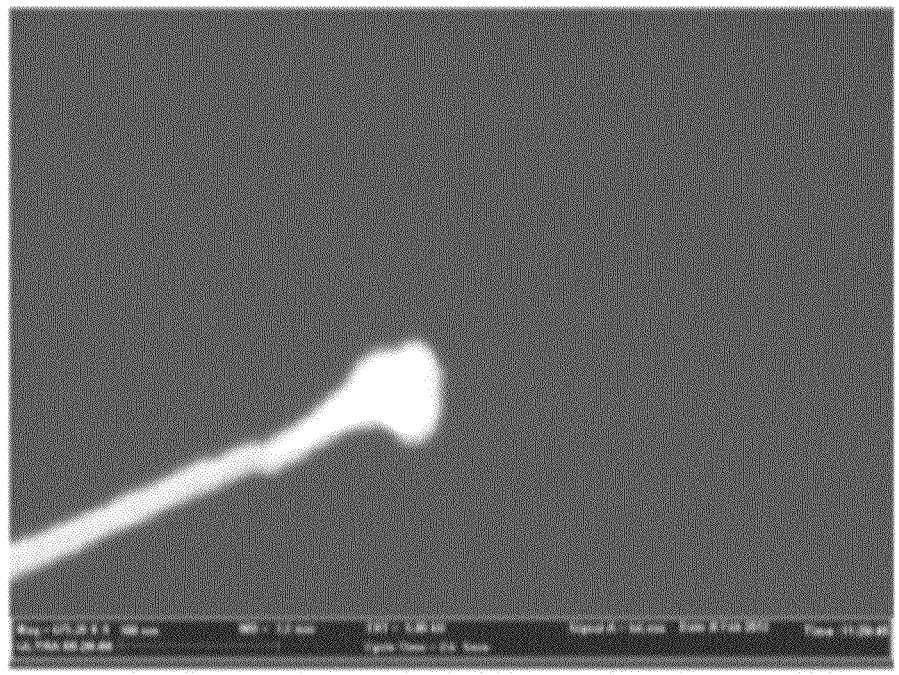
FIGS. 4a-b shows images of carbon nanotubes with and without as-grown end caps.
Figure 4B:
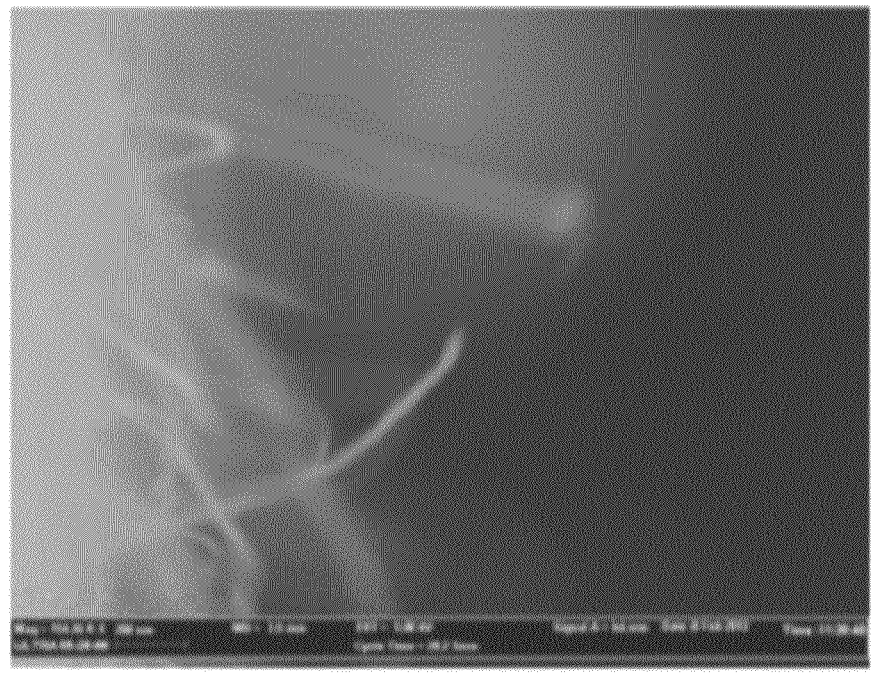

Having a cap over the tubes prior to infiltration significantly increases membrane flux because the cap blocks polymer solution from entering the nanotube pore and thereby making it impermeable. Ethylene grown tubes normally grow closed (with a carbon cap at the end), so they do not need extra steps to be capped. FIG. 4a shows an image of an ethylene-grown CNT, showing the cap at the end of the nanotube. In contrast acetylene-grown tubes grow open (e.g., as shown on FIG. 4b) so prior to infiltration we sputtered a thin layer (less then 10 nm) of gold onto the CNT forest. Gold particles formed caps at the tube end and prevented epoxy entering tube channel. As shown below membranes created using caps had a higher probability of producing high-flux strongly-selective membranes than those created without.

The released membrane was mounted on support plastic mesh and the gas permeability for pressure range 30-40 psi was measured. Depending on the CNT type used and the tube capping process, membranes showed flux 100-1500 GPU at 30 psi pressure and $CO_2/N_2$ selectivity 0.72-0.79 which indicates gas transport though very small (<10 nm) pores. Results are summarized in Table 2.

TABLE 2

| Tube type | Average $N_2$ Permeability (GPU) | Average $CO_2$ Permeability (GPU) | Average Selectivity ($CO_2/N_2$) |
|---|---|---|---|
| Ethylene grown | 1220 | 876 | .72 |
| Acetylene grown | 290 | 230 | .79 |
| Acetylene grown with gold caps | 1640 | 1280 | .78 | permeability for CNT membranes having open and closed nanotubes during polymer infiltration.

Here we see that the membrane that had open-ended nanotubes during polymer infiltration (i.e., the acetylene grown membrane (no gold caps)) has significantly less permeability than either of the membranes that had closed-ended nanotubes during polymer infiltration.

The invention claimed is:

1. A method of making a selectively permeable membrane, the method comprising:
   providing vertically aligned nanotubes having closed top ends on a substrate;
   infiltrating a polymer precursor around the nanotubes;
   curing the polymer precursor to provide a polymer nanotube composite including a polymer matrix around the nanotubes;
   performing mechanical polishing to planarize a top surface of the polymer nanotube composite, wherein the mechanical polishing also opens up the top ends of the nanotubes; and
   releasing the polymer nanotube composite from the substrate to provide a selectively permeable membrane.

2. The method of claim 1, wherein the providing vertically aligned nanotubes comprises forming vertically aligned nanotubes having open top ends on the substrate, followed by closing the top ends of the nanotubes.

3. The method of claim 1, wherein the providing vertically aligned nanotubes comprises forming vertically aligned nanotubes having closed top ends on the substrate.

4. The method of claim 1, wherein the releasing the polymer nanotube composite from the substrate also opens up bottom ends of the nanotubes.

5. The method of claim 1, wherein the nanotubes comprise carbon nanotubes.

6. The method of claim 1, wherein the nanotubes comprise single-walled nanotubes, double-walled nanotubes, and/or multi-walled nanotubes.

7. The method of claim 1, wherein the mechanical polishing provides a membrane thickness of less than about 100 µm.

8. The method of claim 7, wherein the mechanical polishing provides a membrane thickness of less than about 50 µm.

9. The method of claim 8, wherein the mechanical polishing provides a membrane thickness of less than about 35 µm.

10. The method of claim 1, wherein the polymer matrix comprises a cross-linking polymer.

11. The method of claim 1, wherein the polymer matrix comprises a hydrophobic epoxy.

12. The method of claim 1, wherein the providing vertically aligned nanotubes having closed top ends on a substrate comprises a method selected from the group consisting of: thermal chemical vapor deposition (CVD) using a catalyst of iron or nanoparticles, and plasma assisted CVD.

* * * * *